US009353266B2

(12) United States Patent
Goparaju et al.

(10) Patent No.: US 9,353,266 B2
(45) Date of Patent: May 31, 2016

(54) PROCESS FOR MANUFACTURING TITANIUM DIOXIDE PIGMENTS USING ULTRASONICATION (71) Applicant: Tronox LLC, Oklahoma City, OK (US)

(72) Inventors: Venkata Rama Rao Goparaju, Edmond, OK (US); David F. Marshall, Edmond, OK (US); Vahid Kazerooni, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 63 days.

(21) Appl. No.: 14/206,899

(22) Filed: Mar. 12, 2014

(65) Prior Publication Data

US 2014/0261086 A1    Sep. 18, 2014

Related U.S. Application Data (60) Provisional application No. 61/798,857, filed on Mar. 15, 2013.

(51) Int. Cl.
*C09C 3/06* (2006.01)
*C09C 1/36* (2006.01)

(52) U.S. Cl.
CPC .......... *C09C 1/3615* (2013.01); *C09C 1/363* (2013.01); *C09C 1/3623* (2013.01); *C09C 1/3638* (2013.01); *C09C 1/3661* (2013.01); *C09C 1/3692* (2013.01); *C01P 2004/52* (2013.01); *C01P 2004/61* (2013.01)

(58) Field of Classification Search
CPC .... C09C 1/3607; C09C 1/3615; C09C 1/363; C09C 1/3653; C09C 1/3661
See application file for complete search history.

(56) References Cited

U.S. PATENT DOCUMENTS

| 3,208,866 | A | 9/1965 | Lewis et at |
| 3,512,219 | A | 5/1970 | Stern et al. |
| 3,856,929 | A | 12/1974 | Angerman et al. |
| 4,448,609 | A | 5/1984 | Tear et al. |
| 5,201,949 | A | 4/1993 | Allen et al. |
| 5,203,916 | A | 4/1993 | Green et al. |
| 5,332,433 | A | 7/1994 | Story et al. |
| 5,653,793 | A | 8/1997 | Ott et al. |
| 5,700,318 | A | 12/1997 | Brand et al. |
| 5,730,795 | A | 3/1998 | Herkimer |
| 5,730,796 | A | 3/1998 | Brand et al. |
| 5,840,112 | A | 11/1998 | Morris et al. |

(Continued)

FOREIGN PATENT DOCUMENTS

| EP | 0595471 A2 | 5/1994 |
| EP | 0832944 A2 | 4/1998 |

(Continued)

OTHER PUBLICATIONS

Office Action issued Feb. 17, 2015 in corresponding Taiwan application No. 103109772, Tronox LLC.

(Continued)

*Primary Examiner* — Pegah Parvini
(74) *Attorney, Agent, or Firm* — McAfee & Taft, A Professional Corporation (57) ABSTRACT A process for manufacturing titanium dioxide pigment is provided. The process comprises preparing an aqueous slurry of titanium dioxide particles. The process further includes deagglomerating the aqueous slurry of titanium dioxide particles using ultrasonication.

25 Claims, 2 Drawing Sheets

(56) References Cited

U.S. PATENT DOCUMENTS

| | | | |
|---|---|---|---|
| 5,922,120 | A | 7/1999 | Subramanian et al. |
| 5,976,237 | A | 11/1999 | Halko et al. |
| 6,207,131 | B1 | 3/2001 | Magyar et al. |
| 6,350,427 | B1 | 2/2002 | Yuill et al. |
| 6,562,314 | B2 | 5/2003 | Akhtar et al. |
| 6,989,054 | B2 | 1/2006 | Tanabe et al. |
| 8,377,414 | B2 | 2/2013 | Torardi |
| 2009/0297852 | A1 | 12/2009 | Frahm et al. |

FOREIGN PATENT DOCUMENTS

| | | |
|---|---|---|
| EP | 1241139 A1 | 9/2002 |
| JP | H10-110115 | 4/1998 |
| JP | H10-130527 | 5/1998 |
| WO | 94/18940 A1 | 9/1994 |

OTHER PUBLICATIONS

International Search Report and Written Opinion mailed Jul. 10, 2014 in corresponding international application No. PCT/US14/27916, Tronox LLC.

Patent Examination Report No. 1, issued Feb. 16, 2015 in corresponding Australian patent application No. 2014228204, Tronox LLC.

T.I. Brownbridge and J.R. Brand, "Photocatalytic Activity of Titanium Dioxide Pigment," Surface Coatings Australia, Sep. 1990, pp. 6-11 (paper presented at the 32nd Annual SCAA Convention, Perth, Wash., Sep. 1990).

European Search Report dated Jun. 1, 2015 in corresponding European application No. 14763359.8, Tronox LLC.

Office Action in Japanese Application No. 2015-517503, mailed Jan. 26, 2016, Venkata Rama Rao Goparaju.

Office Action in European Application No. 14763359.8, mailed Jan. 25, 2016, Venkata Rama Rao Goparaju.

Office Action in Canadian Application No. 2,871,790, mailed Feb. 26, 2016, Venkata Rama Rao Goparaju.

PROCESS FOR MANUFACTURING TITANIUM DIOXIDE PIGMENTS USING ULTRASONICATION

CROSS-REFERENCE TO RELATED APPLICATIONS

This application claims the benefit of U.S. Provisional Application No. 61/798,857 filed on Mar. 15, 2013, the entirety of which is incorporated herein.

BACKGROUND

Titanium dioxide pigments are used in connection with coating formulations (including paint and ink formulations), paper compositions, polymer compositions and other products. Such pigments are generally produced in powder form with specific properties and characteristics depending on the final application.

The titanium dioxide pigments can be manufactured by either the sulfate process or the chloride process.

In the sulfate process for manufacturing titanium dioxide, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

In the chloride process for manufacturing titanium dioxide, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. Aluminum chloride is typically added to the titanium halide in the oxidation reactor to facilitate rutile formation and control particle size. The titanium dioxide and gaseous reaction products are then cooled, and the titanium dioxide particles are recovered.

Whether produced by the sulfate process or the chloride process, the produced titanium dioxide particles typically undergo further processing steps. For example, further processing steps commonly utilized include: (a) dispersing the particles in an aqueous medium to form a pigment slurry (a dispersing agent such as a polyphosphate is typically used); (b) wet milling the resulting pigment slurry to achieve titanium dioxide particles having a predetermined particle size; (c) precipitating one or more hydrous metal oxide inorganic materials such as silica ceria, zirconia and/or alumina onto the particle surfaces of the wet milled titanium dioxide slurry; (d) flocculating the treated particles and recovering the inorganic oxide-treated titanium dioxide particles from the aqueous slurry by filtration; (e) washing the filtered particles to remove residual salts and impurities thereon; (f) drying the washed filtered particles to provide a dry titanium dioxide pigment powder; and (g) fluid-energy milling the dried pigment. Any agglomerates formed during the above described steps are typically strengthened during the drying stage and usually require energy intensive milling to break down the agglomerates to a desired particle size.

In the pigment manufacturing industry, the fluid-energy milling step is often carried out using either compressed air, steam, or inert gases. Although other processing steps have been combined with fluid-energy milling in an attempt to deagglomerate the pigment at reduced costs, the abrasiveness of such steps can adversely impact the coatings on the pigment.

SUMMARY

A process for manufacturing titanium dioxide pigment is provided. The process comprises preparing an aqueous slurry of titanium dioxide particles. The process further includes deagglomerating the aqueous slurry of titanium dioxide particles using ultrasonication.

DETAILED DESCRIPTION

In accordance with the present invention, a process for manufacturing titanium dioxide pigment is provided. The process comprises (a) preparing an aqueous slurry of titanium dioxide particles; and (b) deagglomerating the aqueous slurry of titanium dioxide particles using ultrasonication. The inventive process can be either a batch or a continuous process. For example, the inventive process can be incorporated into a continuous process for manufacturing and treating (e.g., coating) titanium dioxide particles.

The aqueous slurry can be formed by dispersing titanium dioxide particles in an aqueous medium to form an aqueous slurry of titanium dioxide particles. A dispersing agent, such as a polyphosphate, may be added to the aqueous slurry to facilitate distribution of the titanium dioxide particles therein. Other types of dispersing agents may also be used.

For example, the titanium dioxide particles can be manufactured by either the sulfate process or the chloride process. In one embodiment, the titanium dioxide particles are produced by the chloride process. In another embodiment, the titanium dioxide particle are produced by the sulfate process.

Methods for manufacturing titanium dioxide particles by the sulfate process and the chloride process are well known to those skilled in the art. For example, in the sulfate process, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions. For example, in the chloride process, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. The titanium dioxide and gaseous reaction products are then cooled, and the titanium dioxide particles are recovered.

For example, in the chloride process, aluminum chloride can be added to the reactants as a rutilization aid and particle size control agent along with the titanium halide (for example, the titanium tetrachloride) during the vapor phase oxidation step of the manufacturing process. The aluminum chloride imparts alumina into the lattice structure of the pigment. Other co-oxidants can be used as well. Other hydrous metal oxide oxides formed during the oxidation step can be included in the pigment for various purposes such as particle size control.

The aqueous slurry formed in step (a) can comprise from about five (5) percent by weight to about sixty-five (65) percent by weight of the titanium dioxide particles, based on the total weight of the aqueous slurry. For example, the aqueous slurry formed in step (a) can comprise from about 15 percent by weight to about 45 percent by weight of the titanium dioxide particles, based on the total weight of the aqueous slurry. By way of further example, the aqueous slurry formed in step (a) can comprise from about 25 percent by weight to about 40 percent by weight of the titanium dioxide particles, based on the total weight of the aqueous slurry.

The inventive process includes deagglomerating the aqueous slurry of titanium dioxide particles using ultrasonication. Although not intending to be bound by any particular theory of operation, it is believed that ultrasonication induces cavitations and generates shock waves by collapsing the cavitations. The collapsing cavitations lead to collisions amongst the particles and result in deagglomeration of pigment particles and reduction in size through grinding of the colliding particles.

The ultrasonication step can be carried out by any suitable ultrasonic device in either batch mode or continuous mode.

For example, a UIP2000 ultrasonic device from Hielscher Ultrasound Technology can be used. When such a device is used, effective results can be obtained by carrying out the ultrasonication step for about 20 to about 30 seconds. Other types of ultrasonic devices in addition to or as a substitute for the UIP2000 ultrasonic device sold by Hielscher Ultrasound Technology may be utilized. It should be appreciated that the deagglomeration step using ultrasonication may be carried out for more or less time depending on a number of factors, for example, whether the overall process is carried out in batch or continuously, the make, model, and power of the ultrasonic device, composition of the sample, the volume to be deagglomerated, and the flow rate of the sample composition to be deagglomerated. By way of example, as used and described in this disclosure, the times for the ultrasonication step are in reference to using the UIP2000 ultrasonicating device from Hielscher Ultrasound Technology. Those skilled in the art will be able to adjust the time for the deagglomeration step using ultrasonication based on the above factors such that a desired particle size is achieved. As will be further discussed with regard to Example 1, the particle size distribution before ultrasonication was bimodal with higher mean particle size. The use of ultrasonication deagglomerates the particles, changing their particle size from bimodal to monodisperse with lower mean particle size than the feed.

Ultrasonic devices typically include an ultrasonic transducer and a sonotrode. The ultrasonic transducer creates ultrasonic waves by electrical stimulation which are transferred to the medium to be sonicated through the sonotrode. The power input to the sonotrode can be varied per ultrasonic device. For example, the power input to the UIP2000 ultrasonic device sold by Hielscher Ultrasound Technology, having a maximum power of 2000 Watts (W) can be varied between 50 percent and 100 percent of the maximum power. In both batch and continuous mode, the sonotrode may be immersed into the slurry up to about half its length or as otherwise suggested per manufacturer.

For example, in the batch mode, the sonotrode of the ultrasonic device is typically placed into the slurry in the container to be sonicated to deagglomerate the particles within the slurry. Sonication of the same slurry sample is continued until a final desired particle size is obtained. For example, in continuous mode, the sonotrode of the ultrasonic device is typically placed inside a flow cell reactor in order to process larger samples over longer periods of time in recirculation mode. The feed slurry containing the particles to be deagglomerated will enter the flow cell reactor from one side and is exposed to mechanical ultrasonic vibrations and leave the cell from the other side. The flow rate of the slurry can be adjusted by creating the back pressure in the outlet for effective sonication until the desired particle size is attained. The temperature of the flow cell can be maintained by flowing cool or hot water through the jacket surrounding the flow cell. Depending on the sample to be sonicated and the application, the temperature of the flow cell can be adjusted. For example, as will be discussed further in reference to Example 1, the temperature of the flow cell was maintained at 60 degrees Celsius. It should be appreciated that the above configuration description is illustrative of typical configurations for ultrasonic devices and the ultimate configuration may vary per end-use applications or other factors.

For example, ultrasonicating in batch mode, 2 kilograms (kg) of titanium dioxide slurry (having a coating of inorganic oxides deposited thereon and washed) with a density of 1.8 was ultrasonicated in presence of a dispersant in a 2 liter glass beaker for about one minute at 50 percent amplitude until about 60 percent to about 80 percent of the particles were equal to or less than 0.63 microns. The ultrasonicated slurry was subsequently dried and fluid energy milled.

For example, in continuous mode, titanium dioxide slurry with density of 1.8 (the slurry was obtained after treating the titanium dioxide particles with inorganic oxides and washing) containing a dispersant was pumped through a 100 milliliter (ml) sample cell that was continuously ultrasonicated. Flow rates of the slurry were adjusted to reach the predetermined particle size, for example until about 60 percent to about 80 percent of the particles were equal to or less than 0.63 microns. The sonicated slurry was dried and subsequently fluid energy milled. It should be appreciated that the above examples are for illustrative purposes and are not intended to limit the scope of the inventive process described herein. The processing parameters can be varied depending on the end-use applications of the pigment, the ultrasonic device used and its power, and the processing mode for the ultrasonication step.

Various other process steps Can be combined with the ultrasonication step depending on the particular application including the desired particle size and other properties and characteristics of the pigment. For example, the process for manufacturing titanium dioxide pigment can further comprise the step of milling the aqueous slurry of titanium dioxide in order to reduce the particle size of the titanium dioxide particles. For example, a wet milling step can be used to achieve a predetermined particle size. The milling step can be carried out in either batch or continuous mode. The milling step may be carried by any wet milling methodology known in the art. For example, media milling, including bead milling, sand milling, ball milling, and pebble milling, can be used.

It should be appreciated that steps of the inventive process can be performed in either batch or continuous mode and are not required to match the processing mode of other steps. For example, the milling step can be batch mode and the ultrasonication step can be continuous mode, or vice versa, or both steps can be the same processing mode.

For example, the titanium dioxide slurry is milled for a time sufficient to cause at least 50 percent of the titanium dioxide particles to have a particle size of less than or equal to 0.63 microns (micrometers or µm). By way of further example, the titanium dioxide slurry is milled for a time sufficient to cause at least 75 percent of the titanium dioxide particles to have a particle size of less than or equal to 0.63 microns. For example, the titanium dioxide slurry is milled for a time sufficient to cause at least 94 percent of the titanium dioxide particles to have a particle size of less than or equal to 0.63 microns. It should be appreciated that the milling step can be performed for a predetermined amount of time as well. For example, in another embodiment, the milling step is about 17 minutes. By way of further example, the milling step is about 12 minutes. The milling step may be either done prior to or after the ultrasonication step.

The inventive process for manufacturing titanium dioxide pigment can also comprise the step treating the titanium dioxide particles to deposit at least one hydrous metal oxide coating thereon. The hydrous metal oxide coating(s) are deposited onto the surfaces of the titanium dioxide particles in order to modify or enhance the properties and characteristics of the pigment for particular applications. For example, the hydrous, metal oxide coating(s) can be deposited onto the pigment particles using a wet treatment process.

For example, the titanium dioxide particles can be treated to deposit at least one hydrous metal oxide coating thereon either prior to or after the deagglomeration step using ultrasonication. For example, the hydrous metal oxide coating (s) can be selected from the group consisting of inorganic oxides of aluminum, boron, phosphorus, silicon, titanium, zirconium and mixtures thereof. For example, the hydrous metal oxide coating(s) can be selected from the group of alumina, silica, and mixtures thereof. The addition of silica can impart improved resistance to the deleterious effects of ultraviolet light in end-use applications and further enhance the hiding power of the pigment. Alumina can be used, for example, to ensure smooth processing through filtration, drying, and fluid energy milling, as well as to impart improved dispersibility characteristics to the finished pigment in end-use applications. In many applications, both a coating of silica and a coating of alumina are deposited on the surfaces of the titanium dioxide particles. Alumina is often added as the final treatment layer.

Other examples of coating materials that can be utilized include metal oxides and metal hydroxides such as alumina, aluminum phosphate, silica, zirconia, titania and mixtures thereof. For example, the hydrous metal oxide coatings can be used to improve the opacity, light stability and durability of the pigment, to achieve a desired balance of pigment opacity and flow characteristics, and/or to improve the wetting and dispersing properties of the pigment.

For example, silicon dioxide (for example, a dense silicon dioxide coating) can be used, for example, to improve the durability and resin compatibility of the pigment. The dense silicon dioxide coating may be applied under alkaline wet treatment conditions, with or without additional wet treatment deposited inorganic oxides. An aluminum oxide coating can be used on top of the silicon dioxide coating, for example, to improve opacifying properties and resin compatibility in paint applications. Aluminum phosphate, related phosphate salts and mixtures thereof can be used, for example, as an alternative to silicon dioxide to provide improved pigment durability. An aluminum oxide coating can be placed on top of the aluminum phosphate coating, as discussed above.

For example, the hydrous metal oxide is deposited on the titanium dioxide particles in an amount from about 0.5 percent by weight to about 25 percent by weight, based on the total weight of the titanium dioxide particles. By way of further example, the hydrous metal oxide is deposited on the titanium dioxide particles in an amount from about 0.5 percent by weight to about 15 percent by weight, based on the total weight of the titanium dioxide particles. In yet another example, the hydrous metal oxide is deposited on the titanium dioxide particles in an amount from about 0.5 percent by weight to about 5 percent by weight, based on the total weight of the titanium dioxide particles.

The inventive process can further comprise the step of filtering and the step of washing the coated titanium dioxide particles. The surface treated titanium dioxide particles are recovered via filtering and washing to remove ionic impurities and salts therefrom. For example, in the filtration step, a vacuum-type filtration system or a pressure-type filtration system can be used. Any suitable system for washing and recovering the surface treated titanium dioxide pigments can be used. For example, the filtering and washing steps can be carried out either prior to or after the deagglomeration step using ultrasonication.

For example, the inventive process can further comprise the step of dispersing the titanium dioxide particles in an aqueous slurry comprising from about 30 percent to about 60 percent by weight of the titanium dioxide particles, based on the total weight of the slurry. For example, the dispersing step can be carried out after the titanium dioxide particles are washed and recovered. If necessary or desired, any dispersants known in the art can be added to the final aqueous slurry to preclude any viscosity increase induced by the ultrasonication.

The inventive process can also include one or more steps to place the finished pigment in a form suitable for its intended end-use. For example, the inventive process can further comprise drying the pigment to provide a dry, powder form. The drying step may be carried out using vacuum drying, spin-flash drying, spray drying, or any drying technique known in the art to produce a dry titanium dioxide pigment powder.

For example, the inventive process may further comprise milling the dry titanium dioxide pigment powder to further reduce the size of the titanium dioxide pigment particles to a desired particle size. For example, for end-use applications for paints, the finished pigment particle size may be in the range of about 200 nanometers (nm) to about 350 nanometers (nm).

The particle size of the dried titanium dioxide particles can be reduced to the desired particle size distribution by, for example, milling the particles. For example, a fluid energy mill can be used to mill the particles. Alternatively, the dried particles can be reduced to the desired particle size distribution by steam micronization techniques, including for example, in the presence or absence of additional functional additives known in the art. For example, the dry titanium dioxide pigment powder may be micronized at various steam to pigment ratios ranging from about 1.2 (least energy intensive) to about 1.8 (most energy intensive). It should be appreciated that the micronization steam to pigment ratios may vary depending on the end-use application. For example, by ultrasonicating the coated titanium dioxide pigment, less intense fluid-energy milling can be carried out and a pigment with improved optical properties is provided.

Figure 1:
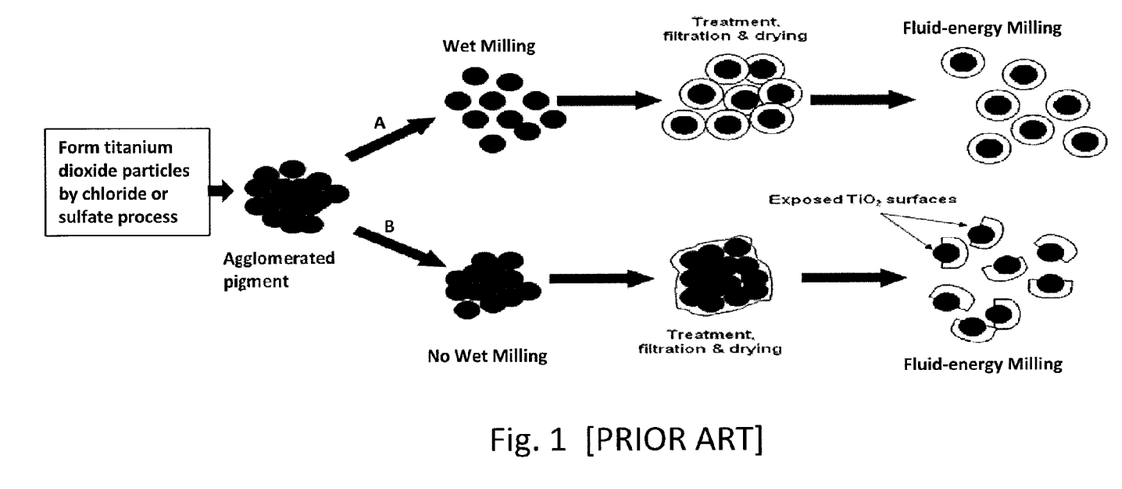
FIG. 1 depicts two prior art processes for manufacturing titanium dioxide pigment.

Referring to the figures, FIG. 1 is a simplified pictorial representation of two prior art processes for manufacturing titanium dioxide pigment. As shown, titanium dioxide particles are first formed by either the sulfate process or the chloride process. In the top portion labeled as path A, the titanium dioxide particles are milled, for example, media milled; surface treated; filtered; washed and dried; and then subjected to another milling, for example fluid-energy milling. The coating of the pigment is maintained. Should additional throughput for manufacture be desired, the energy costs and capital costs required make additional throughput impractical. In the lower portion of FIG. 1, labeled as path B, the agglomerated titanium dioxide pigment particles are surface treated, filtered, washed and dried, and then subjected to fluid-energy milling. As shown in FIG. 1, path B, the resulting coated titanium dioxide pigment has exposed titanium dioxide surfaces. These exposed surfaces adversely affect the pigment as each particle is not fully coated compared to the pigments of path A.

Figure 2:
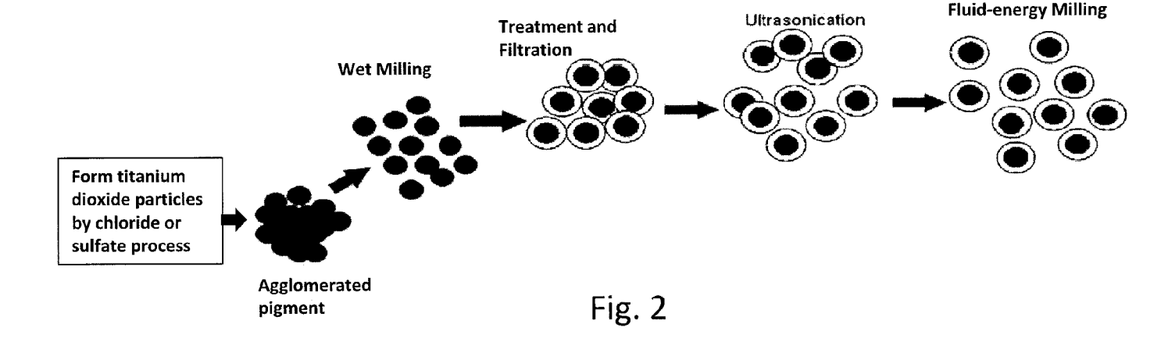
FIG. 2 depicts one embodiment of the inventive process for manufacturing titanium dioxide pigment using ultrasonication.

FIG. 2 shows one embodiment of the inventive process for manufacturing titanium dioxide pigment. The embodiment depicted in FIG. 2 is directed to a process of manufacturing of titanium dioxide pigment in which hydrous oxide surface coated agglomerated titanium dioxide pigment is deagglomerated using ultrasonication and subsequently dried and micronized under less intense conditions (saving energy) to result in a dried finished pigment with improved optical properties and good durability (weatherability).

As shown in FIG. 2, titanium dioxide particles are first formed by either the chloride process or the sulfate process. An aqueous slurry containing agglomerated titanium dioxide particles is then prepared. The agglomerated pigment is then milled in a wet-milling process for a time sufficient to achieve titanium dioxide particles having a predetermined particle size. For example, the time sufficient to achieve titanium dioxide particles having a predetermined particle size where at least 94 percent of the particles have a particle size of less than or equal to 0.63 microns. The milled titanium dioxide pigment is then surface treated to deposit at least one hydrous oxide metal coating thereon. The titanium dioxide particles may then be flocculated or filtered and washed to remove any impurities. Next, the titanium dioxide particles are deagglomerated using ultrasonication. Thereafter, the deagglomerated material is dried and optionally further reduced in size by fluid-energy milling the particles. As shown by FIG. 2, due to the ultrasonication step, the fluid-energy milling step is less intense and the hydrous coating(s) of the final pigment are maintained.

Figure 3:
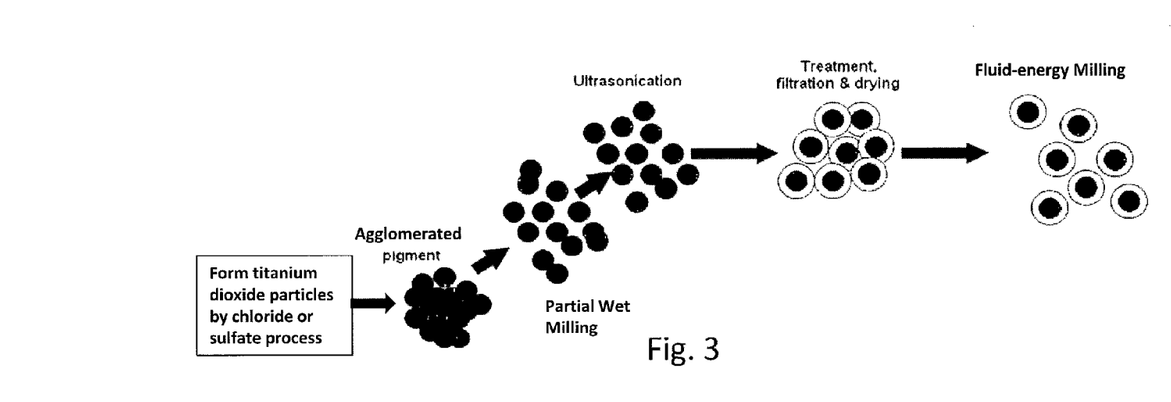
FIG. 3 depicts another embodiment of the inventive process for manufacturing titanium dioxide pigment using ultrasonication.

Another embodiment of the inventive process is shown by FIG. 3. In the embodiment depicted in FIG. 3, both ultrasonication and wet-milling are used to mill the agglomerated titanium dioxide pigment particles before the particles are surface treated. The combined use of deagglomeration through ultrasonication and wet-milling results in a reduced amount of wet-milling time and energy requirements thereby resulting in cost savings in the final pigment manufacturing process while maintaining pigment properties.

As shown in FIG. 3, titanium dioxide particles are first formed by either the chloride process or the sulfate process. An aqueous slurry of titanium dioxide particles is prepared. The agglomerated pigment is then milled in a wet-milling process followed by further deagglomeration using ultrasonication for a time sufficient to achieve titanium dioxide particles having a predetermined particle size. It should be appreciated that the ultrasonication step can be performed either before or after the wet-milling of the agglomerated pigment. For example, the predetermined particle size may be where at least 94 percent of the titanium dioxide particles have a particle size of less than or equal to 0.63 microns. The titanium dioxide pigment is then surface treated with at least one hydrous oxide metal coating deposited thereon. The titanium dioxide particles may then be flocculated or filtered and washed to remove any impurities. Thereafter, the pigment is dried and optionally further reduced in size additional milling, for example, using a fluid-energy mill. The combined use of deagglomeration through ultrasonication and wet-milling prior to coating of the particles results in a reduced amount of wet-milling time and energy requirements thereby resulting in cost savings in the final pigment manufacturing process while maintaining pigment properties.

Another embodiment, not depicted, is the combination of the embodiments described with reference to FIGS. 2 and 3 and includes two deagglomeration steps using ultrasonication steps and a reduced milling time. For example, with reference to FIG. 3, the agglomerated pigment is wet-milled for a reduced amount of time. For example, the milling time may be for a time sufficient to achieve titanium dioxide particles having a predetermined particle size. A first ultrasonication step is carried out as described with reference to FIG. 3 of the uncoated agglomerated pigment. The titanium dioxide pigment is then treated with at least one hydrous metal oxide deposited thereon, recovered and washed as described above in reference to FIG. 2. The washed and coated pigment is deagglomerated using ultrasonication as described with reference to FIG. 2. The pigment is subsequently dried and fluid-energy milled to provide a final titanium dioxide pigment as described with reference to FIG. 2. This combined embodiment is capable of achieving the advantages and benefits described with respect to both FIGS. 2 and 3.

ILLUSTRATIVE EXAMPLES

The following examples provide additional detail and serve to illustrate the described embodiments of this disclosure, without intending to limit or restrict the scope thereof. Concentrations and percentages are by weight unless otherwise indicated.

Example 1

Particulate titanium dioxide pigment particles obtained from the vapor phase oxidation of titanium tetrachloride containing 1.0 percent alumina was dispersed in water in the presence of 0.15 percent by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35 percent by weight of titanium dioxide particles based on the total weight of the slurry. The resulting titanium dioxide slurry was sand milled for 17 minutes using a zircon sand-to-pigment weight ratio of 4 to 1, until a volume average particle size was achieved wherein more than 94 percent of the particles were smaller than 0.63 microns (μm or micrometers), as determined utilizing a Microtrac X100 Particle Size Analyzer (Microtrac Inc., Montgomeryville, Pa.).

The resulting slurry, diluted to 30 percent by weight of titanium dioxide particles, based on the total weight of the slurry, was heated to 75° C. (degrees Celsius) and subsequently treated with 3.0 percent, calculated as silica by weight of final pigment, of sodium silicate, added over 20 minutes as a 250 gram/liter aqueous sodium silicate solution ($SiO_2:Na_2O=3.5$). While maintaining the temperature at 75° C., the pH of the slurry was slowly decreased to pH=5.5 over a 55 minute period via the slow addition of 36 percent of aqueous sulfuric acid solution. Following a digestion period of 15 minutes at pH=7, 2.0 percent alumina, by weight of final pigment, was added over 20 minutes as a 180 gram/liter aqueous sodium aluminate solution, while maintaining the pH of the slurry between a value of 7 and 8.0 via the concomitant addition of 36 percent of aqueous sulfuric acid solution. A sufficient amount of the 2.0 percent alumina was added to deposit the hydrous alumina on the surface of the titanium dioxide particles.

The dispersion was allowed to equilibrate at 75° C. for 15 minutes, at which point the pH of the slurry was re-adjusted to 5.5, if necessary, prior to filtration while hot. The resulting filter cake was washed with an amount of water, which had been preheated to 60° C. equal to 1.5 times the estimated weight of recovered pigment.

The washed semi-solid filter cake was subsequently re-dispersed in water with agitation, and deagglomerated using ultrasonication using UIP2000 from Hielscher Ultrasound Technology in a continuous flow mode. The ultrasonicated material was oven dried at 110° C. overnight, to yield a dry pigment powder.

Figure 4:
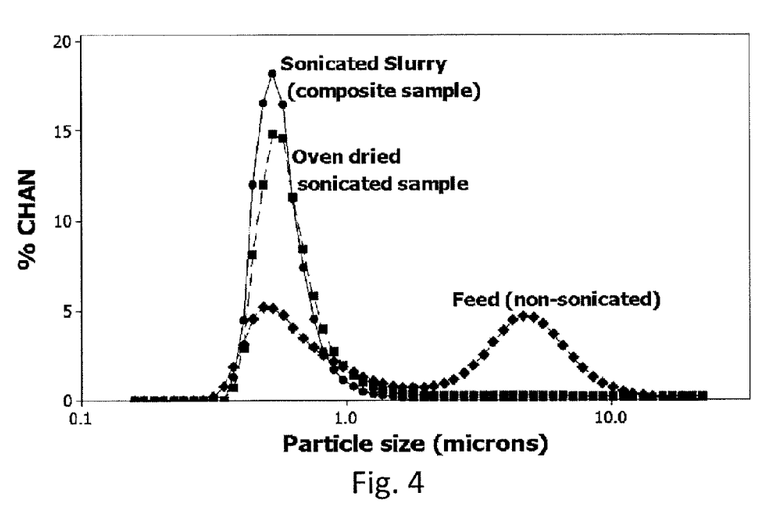
FIG. 4 depicts particle size distribution profiles in connection with Example 1.

As shown in FIG. 4 and Table 1, the particle size distribution of the feed is bimodal with higher mean particle size ($M_v$). The mean particle size of the ultrasonicated composite slurry and the oven dried ultrasonicated slurry have a lower mean particle size than the feed and the particle size what changed from bimodal to monodisperse as shown in FIG. 4.

TABLE 1

Particle size data of the samples before and after ultrasonication

| | | % pass at µm | | | |
|---|---|---|---|---|---|
| | $M_v$ (µm) | 1.06 | 0.63 | 0.486 | 0.446 |
| Feed (before ultrasonication) | 2.78 | 45.1 | 30 | 15.7 | 10.4 |
| Ultrasonicated composite slurry | 0.57 | 98.2 | 76.4 | 29.8 | 14.8 |
| Oven dried ultrasonicated slurry | 0.91 | 84.4 | 55.9 | 30.5 | 22.1 |

The dry pigment powder obtained was steam micronized in the presence of 0.35 percent by weight based on pigment of trimethylolpropane, at various steam to pigment weight ratios, with a steam injector pressure set at 146 psi (pounds per square inch) and micronizer ring pressure set at 118 psi, completing the finished pigment preparation.

Optical properties were evaluated in a 21 pigment volume concentration (PVC) water-borne acrylic latex paint. The pigment sample and a standard pigment are each incorporated in separate portions of a freshly prepared acrylic, latex vehicle at a PVC of 21.0 percent. Both paints are applied, side-by-side, on a Leneta card. The gloss of the dried films is measured from reflected light at a sixty degree angle using a gloss meter. Dry film tint strength was determined as relative tint strength and is calculated from the Y values, and tint tone is determined from the b* values measured with an integrating sphere spectrophotometer. A typical composition of the paint made from acrylic latex resin is given below in Table 2.

TABLE 2

21% PVC Exterior Gloss Acrylic

| | Lbs (pounds) | Gals (gallons) |
|---|---|---|
| Solvent | 50.08 | 5.77 |
| Dispersant | 10.01 | 1.18 |
| Wetting Agent | 5.26 | 0.63 |
| Defoamer | 0.98 | 0.14 |
| Water | 12.02 | 1.19 |
| TiO2 | 250.38 | 7.30 |
| Water | 28.17 | 3.57 |
| Water | 40.89 | 4.90 |
| Acrylic Latex Resin | 544.47 | 62.12 |
| Biocide | 0.97 | 0.11 |
| Defoamer | 0.97 | 0.14 |
| Coalescent | 18.32 | 2.31 |
| Water | 42.25 | 5.07 |
| Thickener | 45.32 | 5.43 |
| pH Adjustment | 1.03 | 0.14 |
| | 1051.10 | 100.00 |

To help determine the degree of integrity of the hydrous oxide coating, pigment photocatalytic activity was determined utilizing the technique documented in T. I. Brownbridge and J. R. Brand, "Photocatalytic Activity of Titanium Dioxide Pigment," *Surface Coatings Australia*, September 1990, pages 6-11 (paper presented at the 32nd Annual SCAA Convention, Perth, Wash., September 1990), as referenced and described in U.S. Pat. No. 5,730,796. This involves the steps of: (1) placing about 0.2 g (grams) of the $TiO_2$ product in about 40 ml (milliliters) of spectroscopic-grade isopropanol; (2) exposing the $TiO_2$/isopropanol suspension to ultraviolet light; (3) monitoring the formation of acetone in the test composition over time; (4) determining, by linear regression analysis, a linear rate of acetone formation in the test composition; and (5) multiplying the calculated rate value by a factor of 1000. The resulting value, reported as High Sensitivity Photocatalytic Activity (HSPCA) slope, is proportional to the photocatalytic response of the pigment upon exposure to ultraviolet light, and provides a measure of accelerated weathering performance of coatings or plastics incorporating the pigment product. Smaller values indicate greater suppression of inherent titanium dioxide pigment photocatalytic activity, and therefore greater durability, or greater resistance to discoloration, both of which directly result from improved integrity of the hydrous oxide coating on pigment particles.

Table 3 provides the data from the above described procedure for a finished titanium dioxide pigment formed using ultrasonication (labeled as "Example 1—ultrasonication"). Table 3 also includes comparative results from two finished pigment samples. The first comparative sample was prepared utilizing the same procedure described above, except ultrasonication was not carried out (labeled as "Comparative Example 1A—no ultrasonication"). An illustrative example of the manufacturing process of the first comparative sample is depicted in FIG. 1 along path A.

The second comparative sample was prepared utilizing the same procedure described above, but instead of ultrasonication, the slurry samples were bead milled using DCP-12 SF Draiswerke, N.J. (labeled as "Comparative Example 1B—milled using bead mill").

TABLE 3

Comparison of finished pigment properties obtained by micronizing at various steam to pigment ratios.

| | Example 1 - ultrasonication | | | Comparative Example 1A - no ultrasonication | | | Comparative Example 1B - milled using bead mill | | |
|---|---|---|---|---|---|---|---|---|---|
| Steam to pigment ratio | 1.2 | 1.5 | 1.8 | 1.2 | 1.5 | 1.8 | 1.2 | 1.5 | 1.8 |
| WB gloss | 58 | 61 | 65 | 57 | 59 | 63 | 61 | 62 | 64 |
| Tint strength | 107 | 108 | 108 | 107 | 109 | 109 | 106 | 107 | 108 |
| HSPCA | 2.6 | 2.6 | 2.9 | 2.4 | 2.9 | 2.6 | 8 | 9 | 11 |

As shown in Table 3, deagglomeration using ultrasonication improves the optical properties of the pigment and micronization can be carried out under less intense conditions. As shown in Table 3 above, the gloss values of the ultrasonicated material is better than the non-ultrasonicated material (Comparative Example 1A) at the same steam to pigment ratio. Referring to Table 3, the ultrasonicated sample micronized at a steam to pigment ratio of 1.5 shows a gloss value of 61 compared to Comparative Example 1A, which shows a gloss value of 59. In order to achieve approximately the same gloss value in Comparative Example 1A, the non-ultrasonicated steam to pigment ratio needs to be increased. As a result, the excess steam is now available to feed more pigment through the micronizer and thus achieve greater throughput for the manufacturing process and also saves in energy consumption and costs.

Also shown in Table 3, the lower HSPCA values indicate durability is maintained in the ultrasonicated material whereas the durability of Comparative Example 1B was adversely affected due to bead milling as a result of the hydrous oxide coating getting peeled off during intense bead milling. Accordingly, ultrasonication does not adversely affect the hydrous oxide surface coated pigment.

Example 2

Particulate titanium dioxide pigment intermediate obtained from the vapor phase oxidation of titanium tetrachloride containing 1.0 percent alumina was dispersed in water in the presence of 0.15 percent by weight (based on pigment) of sodium hexametaphosphate dispersant, along with a sufficient amount of sodium hydroxide to adjust the pH of the dispersion to a value of 9.5 or greater, to achieve an aqueous dispersion with a solids content of 35 percent by weight of titanium dioxide particles based on the total weight of the slurry. The resulting titanium dioxide slurry was sand milled for 12 minutes instead of standard 17 minutes using a zircon sand-to-pigment weight ratio of 4 to 1 and subsequently subjected to ultrasonication until a volume average particle size was achieved wherein more than 94 percent of the particles were smaller than 0.63 microns, as determined utilizing a Microtrac X100 Particle Size Analyzer (Microtrac Inc., Montgomeryville, Pa.) and the data is presented in Table 4.

TABLE 4

Particle size data of sand mill discharge samples

| | % pass at | | |
|---|---|---|---|
| | 0.63 μm | 0.486 μm | 0.446 μm |
| Sand milling for 17 minutes | 94.6 | 52.7 | 29.6 |
| Sand milling for 12 minutes - no ultrasonication | 91.2 | 43.5 | 22.8 |
| Sand milling for 12 minutes followed by ultrasonication | 94.1 | 52 | 29.3 |

Table 4 demonstrates that milling through an ultrasonication step permits a reduction of milling time by 5 minutes while maintaining pigment quality. The sand milling was carried out in batch mode and the ultrasonication step was carried out under continuous flow mode.

The resulting slurry was diluted to 30 percent by weight of titanium dioxide particles, based on the total weight of the slurry, heated to 75° C. and subsequently treated with 3.0 percent, calculated as silica by weight of final pigment, of sodium silicate, added over 20 minutes as a 250 gram/liter aqueous sodium silicate solution ($SiO_2$:$Na_2O$=3.5). While maintaining the temperature at 75° C., the pH of the slurry was slowly decreased to pH=5.5 over a 55 minute period via the slow addition of 36 percent of aqueous sulfuric acid solution. Following a digestion period of 15 minutes at pH=7, 2.0 percent alumina, by weight of final pigment, was added over 20 minutes as a 180 gram/liter aqueous sodium aluminate solution, while maintaining the pH of the slurry between a value of 7 and 8.0 via the concomitant addition of 36 percent of aqueous sulfuric acid solution.

The dispersion was allowed to equilibrate at 75° C. for 15 minutes, at which point the pH of the slurry was re-adjusted to 5.5, if necessary, prior to filtration while hot. The resulting filter cake was washed with an amount of water, which had been preheated to 60° C. equal to 1.5 times the estimated weight of recovered pigment.

The washed semi-solid filter cake was subsequently dried in an oven at 110° C. overnight. The dry pigment powder obtained was steam micronized in the presence of 0.35 percent by weight based on pigment of trimethylolpropane, at steam to pigment weight ratio of 1.8, with a steam injector pressure set at 146 psi and micronizer ring pressure set at 118 psi, completing the finished pigment preparation. The final product obtained was characterized and the data is presented in Table 5 and labeled as "Example 2—Sand milling for 12 minutes and ultrasonication".

Table 5 also provides a comparative result of a finished pigment sample prepared utilizing the same procedure described above, except the particles were sand milled for 17 minutes and ultrasonication was not carried out during any of the processing steps. The comparative example is labeled as "Comparative Example 2A" and a pictorial example of the processing steps is shown by path A of FIG. 1.

TABLE 5

Finished Pigment Properties

| Attributes | Example 2<br>Sand milling for 12<br>minutes and ultrasonication | Comparative Example 2A<br>Sand milling for 17 minutes<br>and no ultrasonication |
|---|---|---|
| Particle size;<br>% pass at<br>0.63 μm | 95 | 94 |
| WB gloss | 66 | 65 |
| Tint strength | 106 | 106 |
| Surface area<br>($m^2/g$) | 13 | 13 |

The above table indicates the properties of the pigment are not influenced by milling method but energy and cost savings are achieved through the combination of sand milling and ultrasonication.

The described processes are well adapted to carry out the objects and attain the ends and advantages mentioned above as well as those inherent therein. While preferred embodiments and examples have been described herein for the purpose of this disclosure, other embodiments of the current disclosure will be apparent to those skilled in the art from a consideration of this specification or practice of the teachings disclosed herein. Thus, the foregoing description is considered merely exemplary with the true scope and spirit of the disclosed being defined by the attached claims.

What is claimed is:

1. A process for manufacturing a titanium dioxide pigment, the process comprising the steps of:
    (a) preparing an aqueous slurry of titanium dioxide particles;
    (b) after step (a), milling the aqueous slurry of titanium dioxide particles;
    (c) after step (b), treating the titanium dioxide particles to deposit at least one hydrous metal oxide coating thereon; and
    (d) after step (c), deagglomerating the aqueous slurry of coated titanium dioxide particles using ultrasonication.

2. The process of claim 1, wherein the titanium dioxide particles are produced by either a sulfate process or a chloride process.

3. The process of claim 1, further comprising:
    filtering and washing the coated titanium dioxide particles.

4. The process of claim 3, further comprising:
    prior to the deagglomerating step, dispersing the titanium dioxide particles in an aqueous medium to provide a slurry comprising from about 30 percent to about 60 percent by weight of said titanium dioxide particles, based on the total weight of the slurry.

5. The process of claim 1, further comprising:
    drying the deagglomerated titanium dioxide particles to provide a dry titanium dioxide pigment powder.

6. The process of claim 5, further comprising:
    milling the dry titanium dioxide pigment powder.

7. The process of claim 1, wherein the aqueous slurry formed in step (a) comprises from about five percent by weight to about 65 percent by weight of said titanium dioxide particles, based on the total weight of the aqueous slurry.

8. The process of claim 1, wherein the aqueous slurry formed in step (a) comprises from about 15 percent by weight to about 45 percent by weight of said titanium dioxide particles, based on the total weight of the aqueous slurry.

9. The process of claim 1, wherein the aqueous slurry formed in step (a) comprises from 25 percent by weight to about 40 percent by weight of said titanium dioxide particles, based on the total weight of the aqueous slurry.

10. The process of claim 1, wherein the hydrous metal oxide is selected from the group consisting of aluminum, boron, phosphorus, silicon, titanium, and zirconium.

11. The process of claim 10, wherein the hydrous metal oxide is deposited on said titanium dioxide particles in an amount from about 0.5 percent by weight to about 25 percent by weight based on the total weight of said titanium dioxide particles.

12. The process of claim 1, wherein the hydrous metal oxide is deposited on said titanium dioxide particles in an amount from about 0.5 percent by weight to about 25 percent by weight based on the total weight of said titanium dioxide particles.

13. The process of claim 1, wherein said slurry is milled for a time sufficient to cause at least 94 percent of the titanium dioxide particles to have a particle size of less than or equal to 0.63 microns.

14. The process of claim 1, wherein the deagglomeration step using ultrasonication is carried out for a time sufficient to cause the titanium dioxide particles to have a predetermined particle size.

15. A process of manufacturing a titanium dioxide pigment, the process comprising the steps of:
    (a) preparing an aqueous slurry of titanium dioxide particles;
    (b) after step (a), milling the aqueous slurry;
    (c) treating the milled titanium dioxide particles to deposit at least one hydrous metal oxide coating thereon;
    (d) deagglomerating the coated titanium dioxide pigment particles using ultrasonication;
    (e) after step (d), milling the deagglomerated particles with a fluid-energy mill.

16. The process of claim 15, wherein the titanium dioxide particles are produced by either a sulfate process or a chloride process.

17. The process of claim 15, further comprising:
    before the deagglomerating of step (d), dispersing the titanium dioxide particles in an aqueous medium to provide an aqueous slurry comprising from about 30 percent to about 60 percent by weight of said titanium dioxide particles, based on the total weight of the slurry.

18. The process of claim 15, wherein the aqueous slurry formed in step (a) comprises from about five percent by weight to about 65 percent by weight of said titanium dioxide particles, based on the total weight of the aqueous slurry.

19. The process of claim 15, wherein the aqueous slurry formed in step (a) comprises from about 15 percent by weight to about 45 percent by weight of said titanium dioxide particles, based on the total weight of the aqueous slurry.

20. The process of claim 15, wherein the aqueous slurry formed in step (a) comprises from 25 percent by weight to about 40 percent by weight of said titanium dioxide particles, based on the total weight of the aqueous slurry.

21. The process of claim 15, wherein the hydrous metal oxide is selected from the group consisting of aluminum, boron, phosphorus, silicon, titanium, and zirconium.

22. The process of claim 15, wherein the hydrous metal oxide is deposited on said titanium dioxide particles in an amount from about 0.5 percent by weight to about 25 percent by weight based on the total weight of said titanium dioxide particles.

23. A process of manufacturing a titanium dioxide pigment, the process comprising the steps of:

(a) preparing an aqueous slurry of titanium dioxide particles;
(b) after step (a), deagglomerating the aqueous slurry using ultrasonication;
(c) after step (b), treating the titanium dioxide particles to deposit at least one hydrous metal oxide coating thereon; and
(d) after step (c), deagglomerating the coated titanium dioxide pigment particles using ultrasonication.

24. The process of claim 23, further comprising the step of, after step (a) and prior to step (c), milling the aqueous slurry.

25. The process of claim 23, further comprising:
after step (c), dispersing the coated titanium dioxide particles in an aqueous medium to provide a slurry comprising from about 30 percent to about 60 percent by weight of said titanium dioxide particles, based on the total weight of the slurry.

* * * * *